US008259663B2

(12) United States Patent
Oh et al.

(10) Patent No.: US 8,259,663 B2
(45) Date of Patent: Sep. 4, 2012

(54) METHODS AND SYSTEMS USING EFFICIENT RANGING MESSAGE TRANSMISSION DURING INITIAL RANGING

(75) Inventors: Kyoung Cheol Oh, Danville, CA (US); Nitin Pant, San Diego, CA (US); Shan Qing, San Diego, CA (US); Fangqi Hu, San Diego, CA (US); Feng K. Guo, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 566 days.

(21) Appl. No.: 12/434,476

(22) Filed: May 1, 2009

(65) Prior Publication Data
US 2010/0278151 A1 Nov. 4, 2010

(51) Int. Cl.
*H04W 4/00* (2009.01)
(52) U.S. Cl. ......... 370/329; 370/341; 370/342; 370/350
(58) Field of Classification Search .................. 370/208, 370/329, 332, 335, 348, 341, 342, 350; 455/450
See application file for complete search history.

(56) References Cited

U.S. PATENT DOCUMENTS

| 2005/0058058 | A1* | 3/2005 | Cho et al. ............. 370/208 |
| 2006/0203712 | A1* | 9/2006 | Lim et al. ............. 370/208 |
| 2006/0239241 | A1* | 10/2006 | Eom et al. ............ 370/348 |
| 2008/0159235 | A1* | 7/2008 | Son et al. ............. 370/332 |
| 2008/0298315 | A1 | 12/2008 | Ihm et al. |
| 2009/0069024 | A1* | 3/2009 | Lee et al. ............. 455/450 |

OTHER PUBLICATIONS

IEEE Computer Society and the IEEE Microwave Theory and Techniques Society: "Extract from: IEEE Standard for Local and Metropolitan Area Networks—Part 16: Air Interface for Fixed Broadband Wireless Access Systems," IEEE Standard, (Oct. 1, 2004), pp. 1, 35-44, 171-184, 199-216, 477-480.
International Search Report and Written Opinion—PCT/US2010/033287, International Search Authority—European Patent Office—Aug. 5, 2010.
NEC: "Resource allocations in target cell after Handover," 3GPP Draft TSG-RAN WG2 #57; R2-070656, 3rd Generation Partnership Project (3GPP), St. Louis, USA: (Feb. 16, 2007), XP050133699.

* cited by examiner

*Primary Examiner* — Hassan Kizou
*Assistant Examiner* — Toan Nguyen
(74) *Attorney, Agent, or Firm* — Tyler Overall (57) ABSTRACT

Techniques for efficient transmission of messages in a ranging procedure between a mobile station (MS) and a base station (BS) are provided. The techniques may allow efficient bandwidth allocation for the ranging procedure.

40 Claims, 11 Drawing Sheets

METHODS AND SYSTEMS USING EFFICIENT RANGING MESSAGE TRANSMISSION DURING INITIAL RANGING

TECHNICAL FIELD

Certain embodiments of the present disclosure generally relate to wireless communication and, more particularly, to a technique for efficient transmission of ranging messages.

SUMMARY

Certain embodiments provide a method for wireless communications by a mobile station (MS). The method generally includes receiving, from a base station (BS), a first message during a ranging procedure comprising information about initial allocated bandwidth for the MS, requesting allocation of additional bandwidth, receiving a message from the BS comprising information about additional bandwidth, and transmitting at least a portion of a ranging request message using the additional bandwidth.

Certain embodiments provide a method for wireless communications by a base station (BS). The method generally includes transmitting, during a ranging procedure, a message comprising information regarding initial bandwidth allocated to a mobile station (MS), receiving, from the MS in the initial allocated bandwidth, a message requesting allocation of additional bandwidth, transmitting a message to the MS with information regarding additional allocated bandwidth, and receiving at least a portion of a ranging request message in the additional allocated bandwidth.

Certain embodiments provide an apparatus for wireless communications. The apparatus generally includes logic for receiving, from a base station (BS), a first message during a ranging procedure comprising information about initial allocated bandwidth for the apparatus, logic for requesting allocation of additional bandwidth, logic for receiving a message from the BS comprising information about additional bandwidth, and logic for transmitting at least a portion of a ranging request message using the additional bandwidth.

Certain embodiments provide an apparatus for wireless communications. The apparatus generally includes logic for transmitting, during a ranging procedure, a message comprising information regarding initial bandwidth allocated to a mobile station (MS), logic for receiving, from the MS in the initial allocated bandwidth, a message requesting allocation of additional bandwidth, logic for transmitting a message to the MS with information regarding additional allocated bandwidth, and logic for receiving at least a portion of a ranging request message in the additional allocated bandwidth.

Certain embodiments provide an apparatus for wireless communications. The apparatus generally includes means for receiving, from a base station (BS), a first message during a ranging procedure comprising information about initial allocated bandwidth for the apparatus, means for requesting allocation of additional bandwidth, means for receiving a message from the BS comprising information about additional bandwidth, and means for transmitting at least a portion of a ranging request message using the additional bandwidth.

Certain embodiments provide an apparatus for wireless communications. The apparatus generally includes means for transmitting, during a ranging procedure, a message comprising information regarding initial bandwidth allocated to a mobile station (MS), means for receiving, from the MS in the initial allocated bandwidth, a message requesting allocation of additional bandwidth, means for transmitting a message to the MS with information regarding additional allocated bandwidth, and means for receiving at least a portion of a ranging request message in the additional allocated bandwidth.

Certain embodiments provide a computer program product for wireless communications by a mobile station (MS), the computer program product comprising a computer-readable medium having instructions stored thereon, the instructions being executable by one or more processors. The instructions generally include instructions for receiving, from a base station (BS), a first message during a ranging procedure comprising information about initial allocated bandwidth for the MS, instructions for requesting allocation of additional bandwidth, instructions for receiving a message from the BS comprising information about additional bandwidth, and instructions for transmitting at least a portion of a ranging request message using the additional bandwidth.

Certain embodiments provide a computer program product for wireless communications, the computer program product comprising a computer-readable medium having instructions stored thereon, the instructions being executable by one or more processors. The instructions generally include instructions for transmitting, during a ranging procedure, a message comprising information regarding initial bandwidth allocated to a mobile station (MS), instructions for receiving, from the MS in the initial allocated bandwidth, a message requesting allocation of additional bandwidth, instructions for transmitting a message to the MS with information regarding additional allocated bandwidth, and instructions for receiving at least a portion of a ranging request message in the additional allocated bandwidth.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiment(s) can be practiced without these specific details. In other instances, well-known structures and devices are shown in block diagram form in order to facilitate describing certain embodiments.

In a wireless network supported by Worldwide Interoperability for Microwave Access (WiMAX) standard, during network entry procedure, a base station (BS) allocates certain amount of frequency bandwidth to a mobile station (MS) and notifies the MS of the allocated bandwidth through the Code Division Multiple Access (CDMA) allocation (CDMA_Allocation_IE) in the UL-MAP (Uplink MAP) message. The MS uses the allocated bandwidth to transmit a Ranging Request (RNG-REQ) message to the BS. The BS usually does not know size of the RNG-REQ message in advance. Therefore, the BS may over-allocate or under-allocate bandwidth resource for transmission of RNG-REQ message.

In addition, a BS does not have information about channel conditions at the MS. Therefore, a modulation and coding scheme (MCS) chosen by the BS to transmit a RNG-RSP message may not be efficient. The BS may use a very conservative MCS to send the RNG-RSP message in order to avoid decoding failure at the MS.

Certain embodiments of the present disclosure present techniques to increase the efficiency of network entry procedure.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
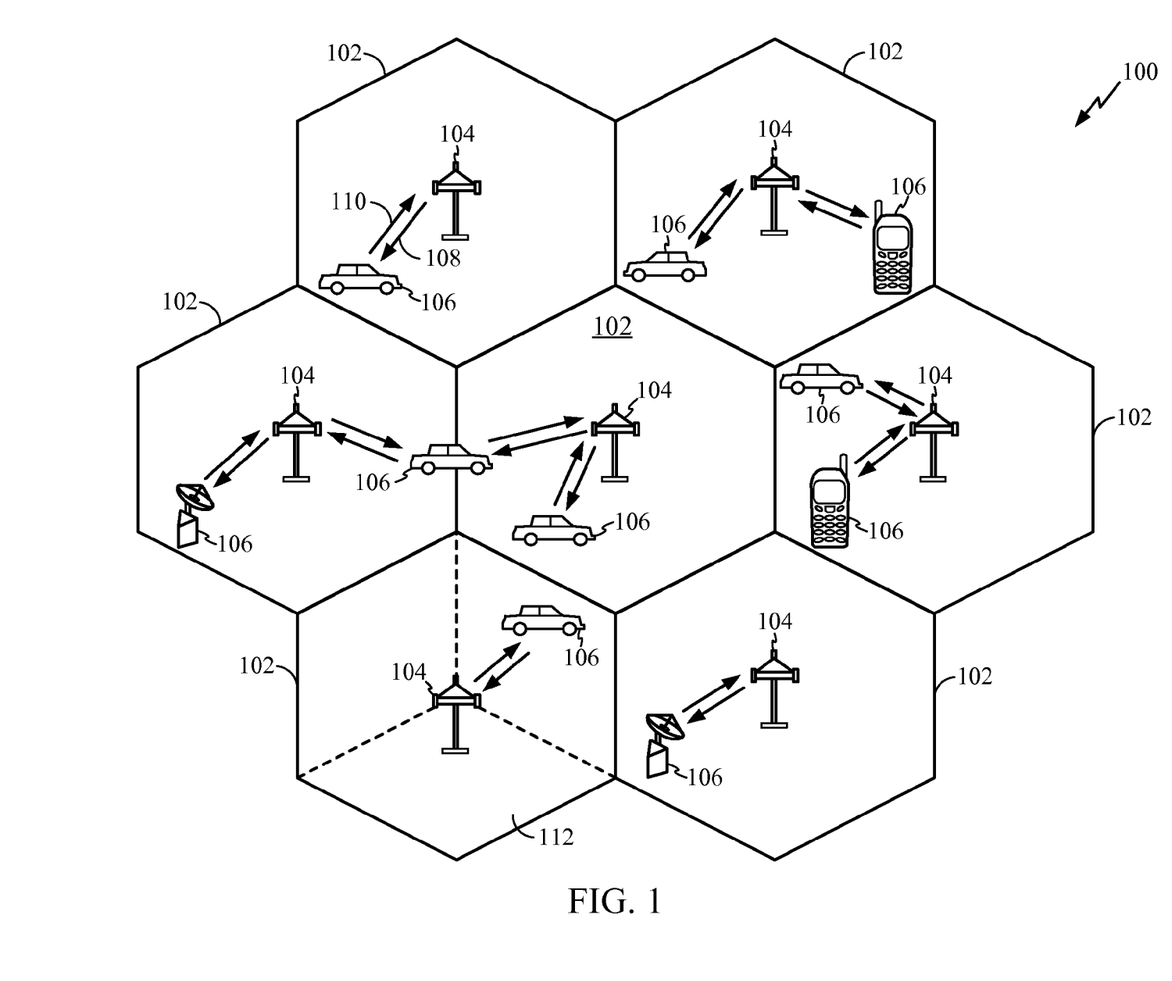
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
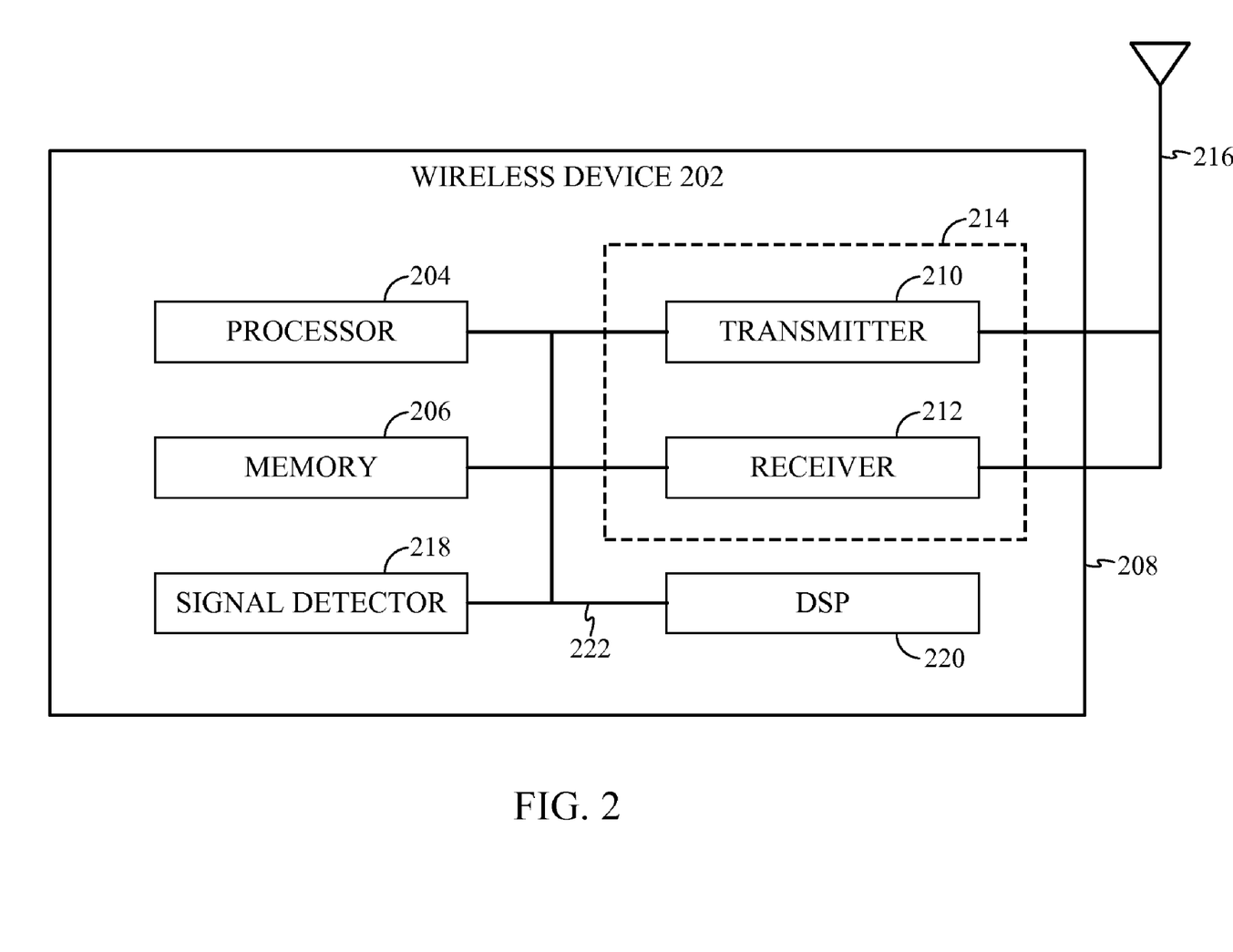
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
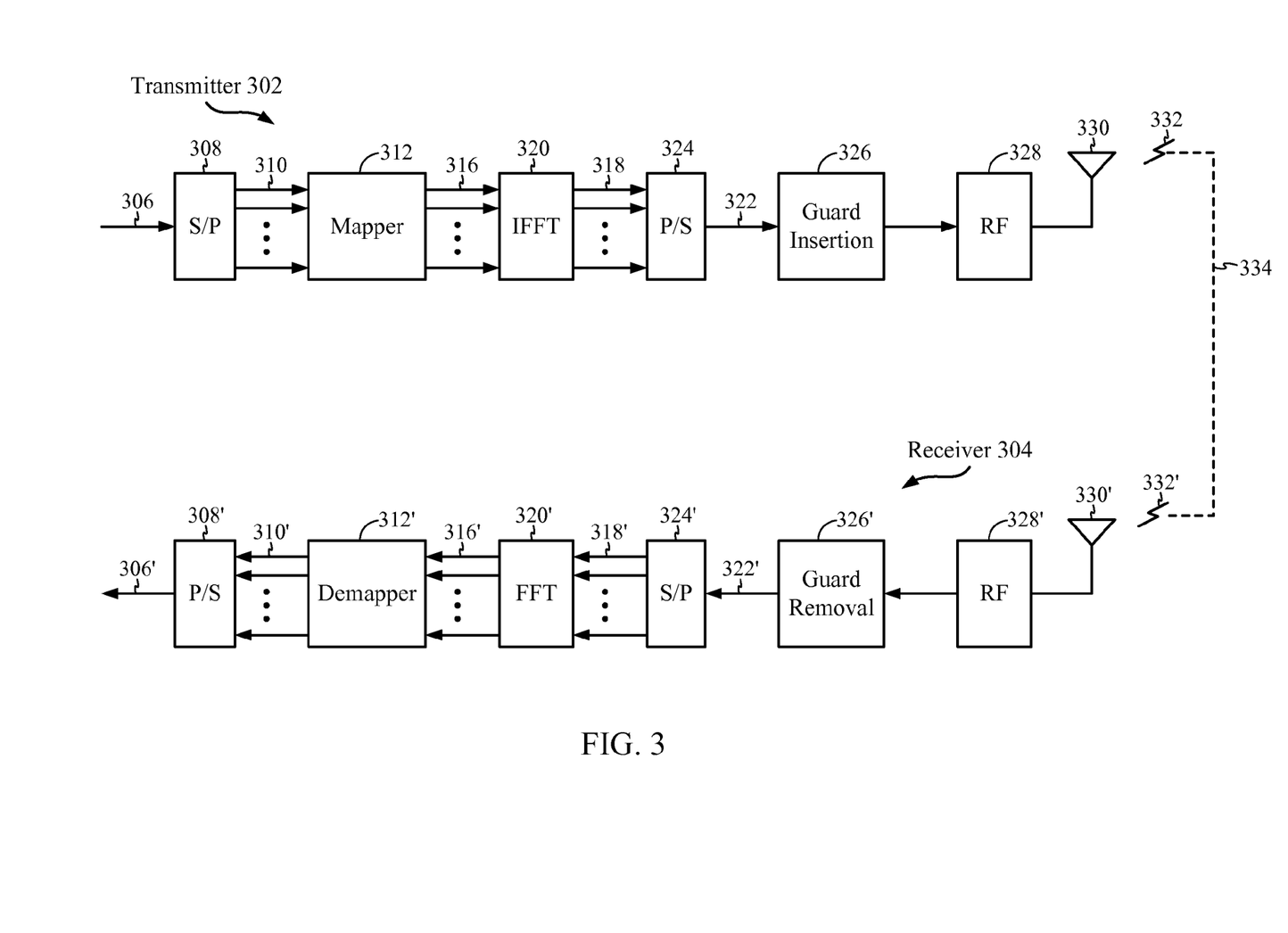
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Efficient Ranging Message Transmission During Initial Ranging

In a wireless network supported by WiMAX standard, during network entry procedure, a base station allocates certain amount of frequency bandwidth to a mobile station (MS) and notifies the MS of the allocated bandwidth through a Code Division Multiple Access (CDMA) allocation (CDMA_Allocation_IE) in the UL-MAP message. The MS uses the allocated bandwidth to transmit a Ranging Request (RNG-REQ) message to the BS to request for ranging. In WiMAX, ranging is an uplink physical layer procedure that maintains the quality and reliability of the radio-link communication between the BS and the MS.

The BS does not usually know size of the RNG-REQ message in advance. Therefore, the BS may over-allocate or under-allocate bandwidth for the RNG-REQ message transmission. If the BS over-allocates the bandwidth, some of the resources may be wasted. If the BS under-allocates the bandwidth, the MS may not be able to transmit the RNG-REQ message.

A BS may not know channel conditions at a MS. Therefore, a modulation and coding scheme (MCS) chosen by the BS to transmit a Ranging Response (RNG-RSP) message may not be efficient. The BS may use a very conservative MCS to send the RNG-RSP message in order to avoid decoding failure at the MS, which may be inefficient if a less conservative MCS would suffice.

Figure 4:
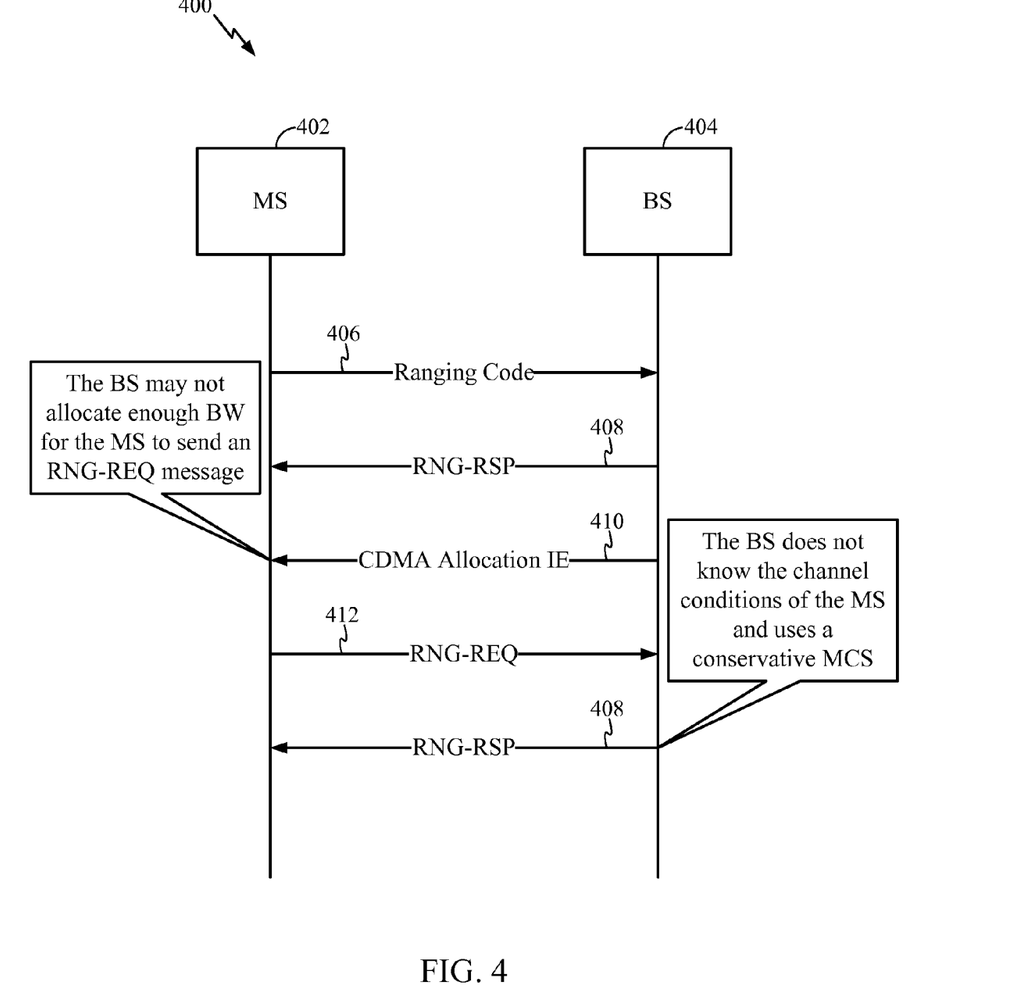
FIG. 4 illustrates example messages exchanged between a base station and a mobile station during ranging procedure in Worldwide Interoperability for Microwave Access (WiMAX) standard.

FIG. 4 illustrates example messages exchanged between a MS and a BS during a ranging procedure. MS 402 may transmit a ranging code message 406 to the BS 404. The BS may transmit a ranging response RNG-RSP message 408 after reception of the ranging code. In addition, the BS may allocate some bandwidth to the MS and may transmit a CDMA_Allocation_IE 410 in the UL-MAP message to the MS with information about the allocated bandwidth. The MS may use the allocated bandwidth to transmit a ranging request (RNG-REQ) 412 message to the base station. In some cases, the allocated bandwidth may not be enough for the MS to transmit the RNG-REQ message completely.

Next, the BS may send a RNG-RSP message to the MS. Since the BS does not know channel conditions at the MS, it may use a conservative MCS to transmit the RNG-RSP message to the MS.

Certain embodiments of the present disclosure provide a technique, in which a MS may send a request for additional bandwidth for transmission of a RNG-REQ message. For another embodiment, MS may send information about channel conditions between a MS and a BS so that the BS chooses a suitable modulation and coding scheme for the subsequent transmissions.

Figure 5:
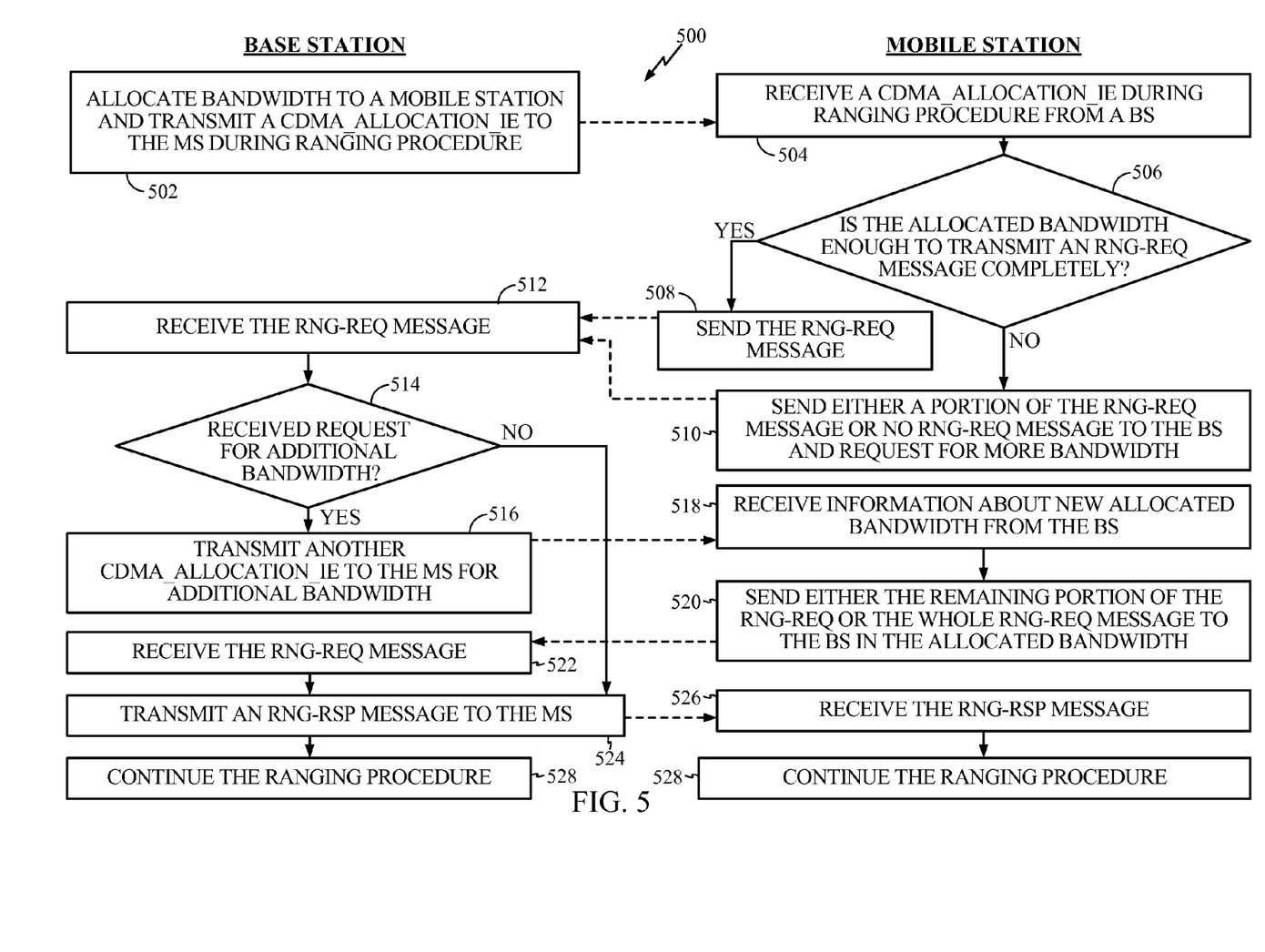
FIG. 5 illustrates example operations for an efficient initial ranging procedure in a WiMAX network in accordance with certain embodiments of the present disclosure.

FIG. 5 illustrates example operations for an efficient initial ranging procedure in a WiMAX network in accordance with certain embodiments of the present disclosure. At 502, a base station may allocate some bandwidth to a mobile station and may transmit a CDMA_Allocation_IE in the UL-MAP message to the MS. At 504, the MS may receive the CDMA_Allocation_IE from the BS and may check if the allocated bandwidth is enough to transmit a RNG-REQ message completely 506.

If the allocated bandwidth is enough, at 508, the MS may send the RNG-REQ message to the BS. If the allocated bandwidth is not enough, at 510, the MS may send either a fragment of the RNG-REQ message or no RNG-REQ message to the BS and may request for more bandwidth to be allocated by transmitting a Bandwidth Request (BR) MPDU with Grant Management Subheader (GMSH) indicating the total number of bytes required to send the RNG-REQ message. The Connection Identification (CID) of BR MPDU may be set to zero because the MS may not have an assigned Basic or Primary Management CID yet. The BS may receive the RNG-REQ message and the request for more bandwidth at 512 and 514.

If the BS receives a bandwidth-request in the data burst allocated by the CDMA_Allocation_IE, at 516, the BS may transmit another CDMA_Allocation_IE to the MS containing information about newly allocated bandwidth. The new CDMA_Allocation_IE in the UL-MAP message may contain the same ranging code attributes (i.e. frame number, transmission opportunity offset and ranging code) as the previous CDMA_Allocation_IE in order to identify the same MS. At 520, the MS may send either remaining portion of the RNG-REQ message or a complete RNG_REQ message in the newly allocated bandwidth. At 522-524, the BS may receive the RNG-REQ message and may transmit a RNG-RSP message to the MS. At 528, the MS and the BS may continue the rest of the ranging procedure.

Figure 6:
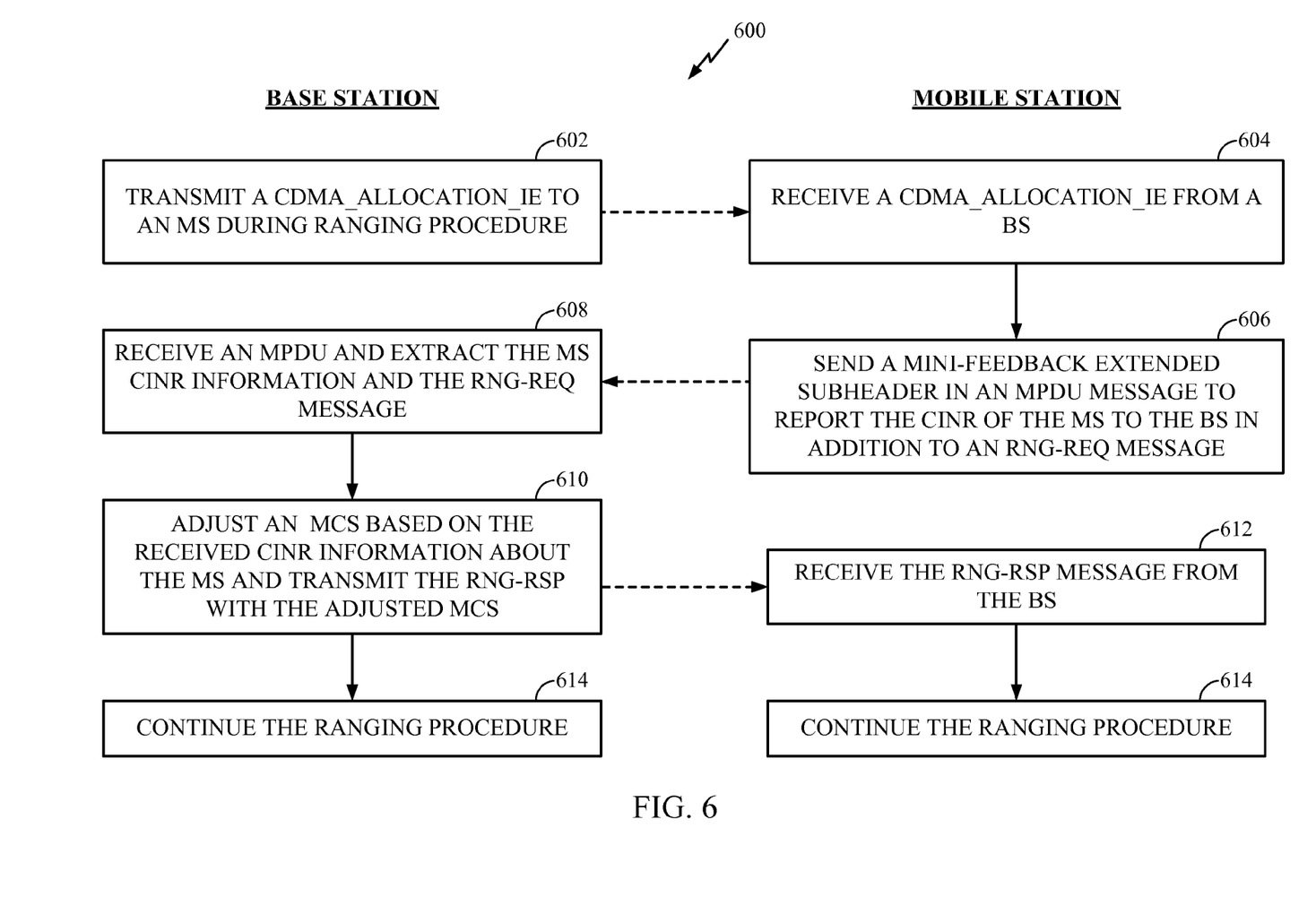
FIG. 6 illustrates example operations for adjusting a modulation and coding scheme (MCS) during ranging procedure in a WiMAX network in accordance with certain embodiments of the present disclosure.

For certain embodiments of the present disclosure, the modulation and coding scheme (MCS) used during a ranging procedure may be optimized with respect to channel conditions of a mobile station. FIG. 6 illustrates example operations for adjusting the MCS utilized in subsequent transmissions in a WiMAX network. At 602, a base station may transmit a CDMA_Allocation_IE to a MS during ranging procedure. At 604, the MS may receive the CDMA_Allocation_IE and may decode the information inside it. At 606, the MS may send a Mini-Feedback-Extended-subheader in a MAC Packet Data Unit (MPDU) to report the carrier to noise plus interference ratio (CINR) of the channel between the MS and the BS while sending a RNG-REQ message. The BS may receive the MPDU message 608, may extract the CINR value of MS, and may adjust the modulation and coding scheme of the transmission based on the received CINR value 610. At 614, the MS and the BS may continue the ranging procedure.

Figure 7:
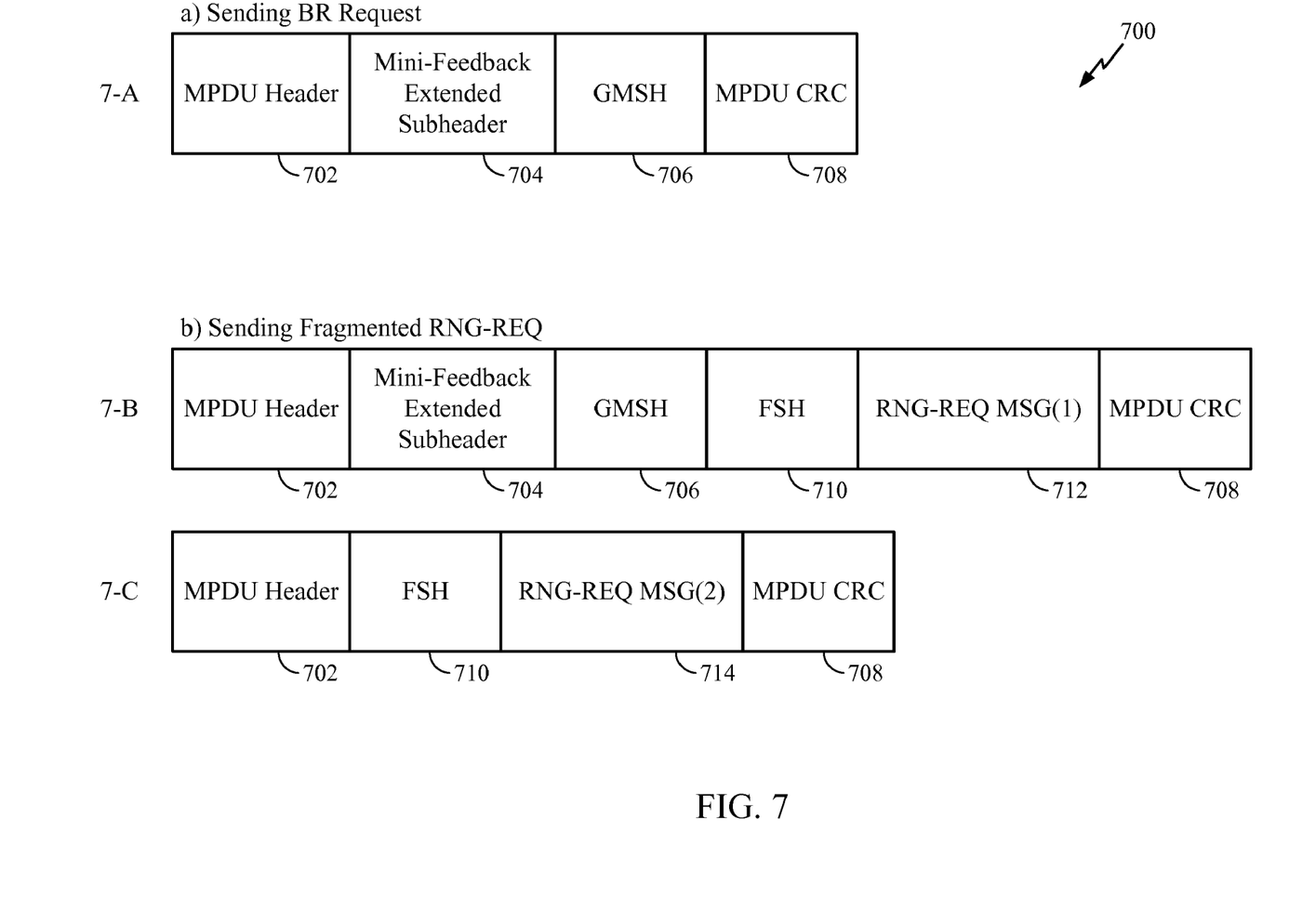
FIGS. 7A-7C illustrate three example medium access control (MAC) packet data units (MPDU) transmitted during initial ranging in accordance with certain embodiments of the present disclosure.

FIG. 7 illustrates an example structure of a MAC Packet Data Unit (MPDU) in accordance with certain embodiments of the present disclosure. If the CDMA_Allocation_IE in the UL-MAP message does not include enough bandwidth for the complete RNG-REQ transmission, MS may only send a MPDU block similar to the FIG. 7A and request for additional bandwidth enough for transmitting the RNG-REQ message completely. The MPDU block in FIG. 7A may contain MPDU header 702, Mini-feedback extended subheader (MFES) 704, Grant Management Subheader (GMSH) 706, and MPDU cyclic redundancy check (CRC) 708 fields. The MPDU header 702 may contain critical information about the MPDU block. The Mini-Feedback Extended Subheader (MFES) 704 may include CINR value measured by the MS. MFES Type may be, for example, 0b0001 indicating average CINR value for downlink transmission. The GMSH may contain information about the total number of bytes required to send the RNG-REQ message.

For certain embodiment of the present disclosure, if the MS decides to send a fragment of the RNG-REQ message to the BS while requesting extra bandwidth, it may utilize a MPDU block similar to FIG. 7B. The MPDU block may contain MPDU header 702, MFES 704, GMSH 706, Fragmentation Subheader (FSH) 710, a portion of RNG-REQ message 712, and MPDU CRC 708. The last MPDU block, similar to the FIG. 7C, may not include any MFES or GMSH fields.

For certain embodiments of the present disclosure, a BS may not allocate a large bandwidth to a MS to cover the largest size of RNG-REQ message, instead, the BS may allocate a smaller frequency bandwidth to the MS at the beginning of the ranging procedure and wait for the MS to request for more bandwidth if needed.

After receiving all the fragments of the RNG-REQ message in addition to the information about the CINR value of the MS, a BS may send a RNG-RSP message with a proper MCS based on the CINR information received in the Mini-Feedback Extended Subheader. Since the CID is zero in all the MPDUs received from different mobile stations, BS may not be able to distinguish different users by means of their CIDs. Therefore, the BS may have to keep track of the CDMA_Allocation_IE and fragmented RNG-REQ messages from each MS on the bandwidth allocated by the CDMA_Allocation_IE.

Figure 8A:
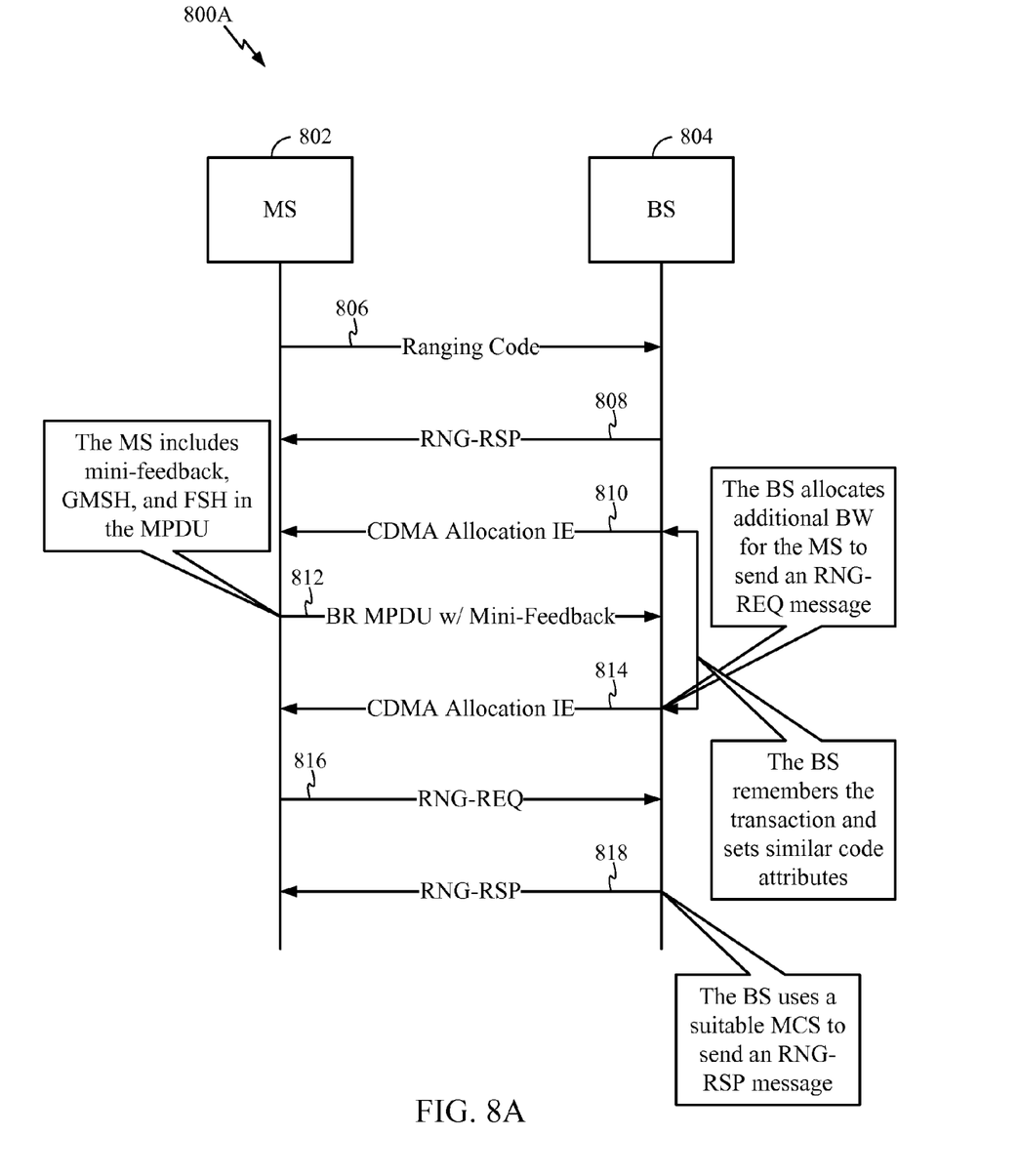
FIGS. 8A-8B illustrate example messages exchanged between a base station and a mobile station, in accordance with certain embodiments of the present disclosure.
Figure 8B:
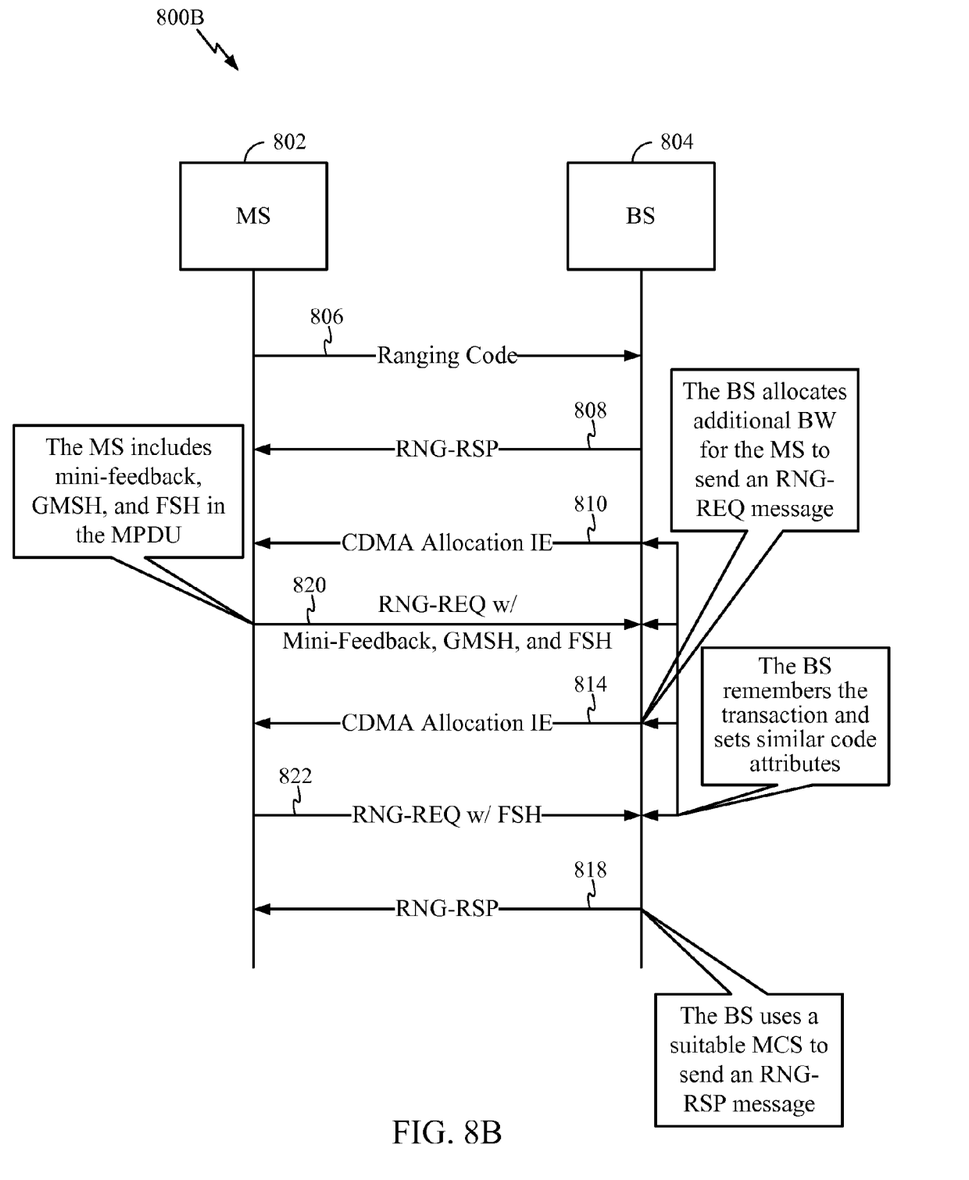

FIGS. 8A-8B illustrate an example exchange of messages between a base station and a mobile station when the allocated bandwidth is not enough for transmission of RNG_REQ message in accordance with certain embodiments of the present disclosure. As illustrated in FIG. 8A, a MS 802 may send a ranging code 806 to a base station 804 asking to start a network entry procedure. The BS may transmit a RNG-RSP message 808 to the MS in addition to a CDMA_Allocation_IE 810 that contains information about the allocated bandwidth. The MS may send a BR MPDU message 812 and may request for more bandwidth instead of sending a RNG-REQ message. The MS may also include Mini-Feedback, GMSH and FSH in the MPDU. At 814, the BS may allocate additional bandwidth to the MS for sending the RNG-REQ message and may send a new CDMA_Allocation_IE to the MS at 814. The BS may set the same code attributes in the new CDMA_Allocation_IE in the new UL-MAP message as the previous CDMA_Allocation_IE for the same MS. At 816, the MS may send the RNG-REQ message. At 818, the BS may send a RNG-RSP message to the MS using an optimized modulation and coding scheme.

FIG. 8B is similar to the FIG. 8A with the difference in 812 vs. 820, in which MS may send a fragment of the RNG-REQ message in addition to the GMSH and FSH to the BS while asking for more bandwidth. The MS may also include a FSH with the subsequent RNG-REQ messages 822 to indicate which fragment of the RNG-REQ message is being transmitted.

Certain embodiments of the present disclosure may enable a BS to allocate proper amount of bandwidth to a MS for transmitting a RNG-REQ message and to use an efficient modulation and coding scheme to transmit a RNG-RSP message. As described above, certain embodiments of the present disclosure improve the efficiency of ranging procedure.

Figure 5A:
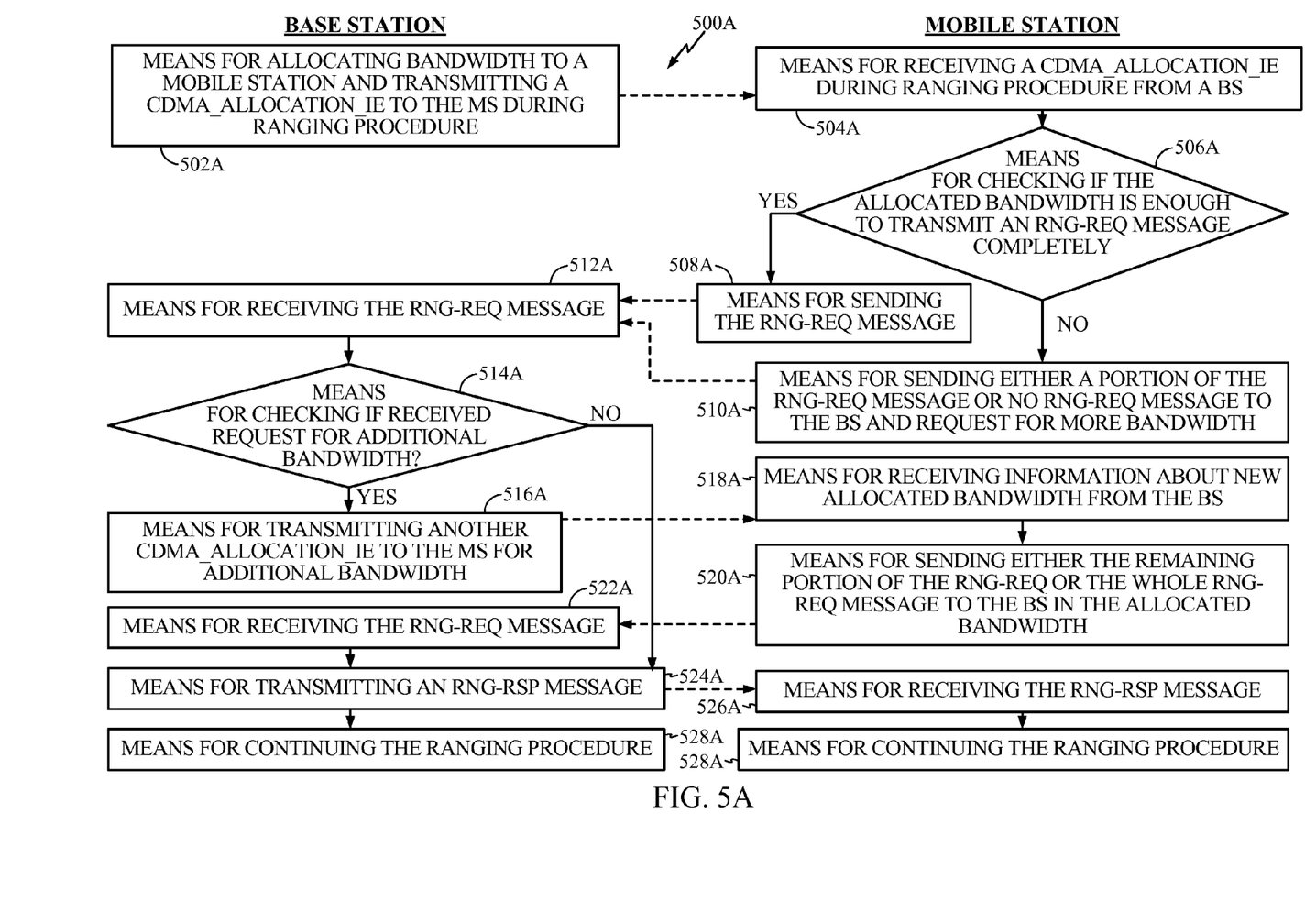
FIG. 5A illustrates example components capable of performing the operations illustrated in FIG. 5.
Figure 6A:
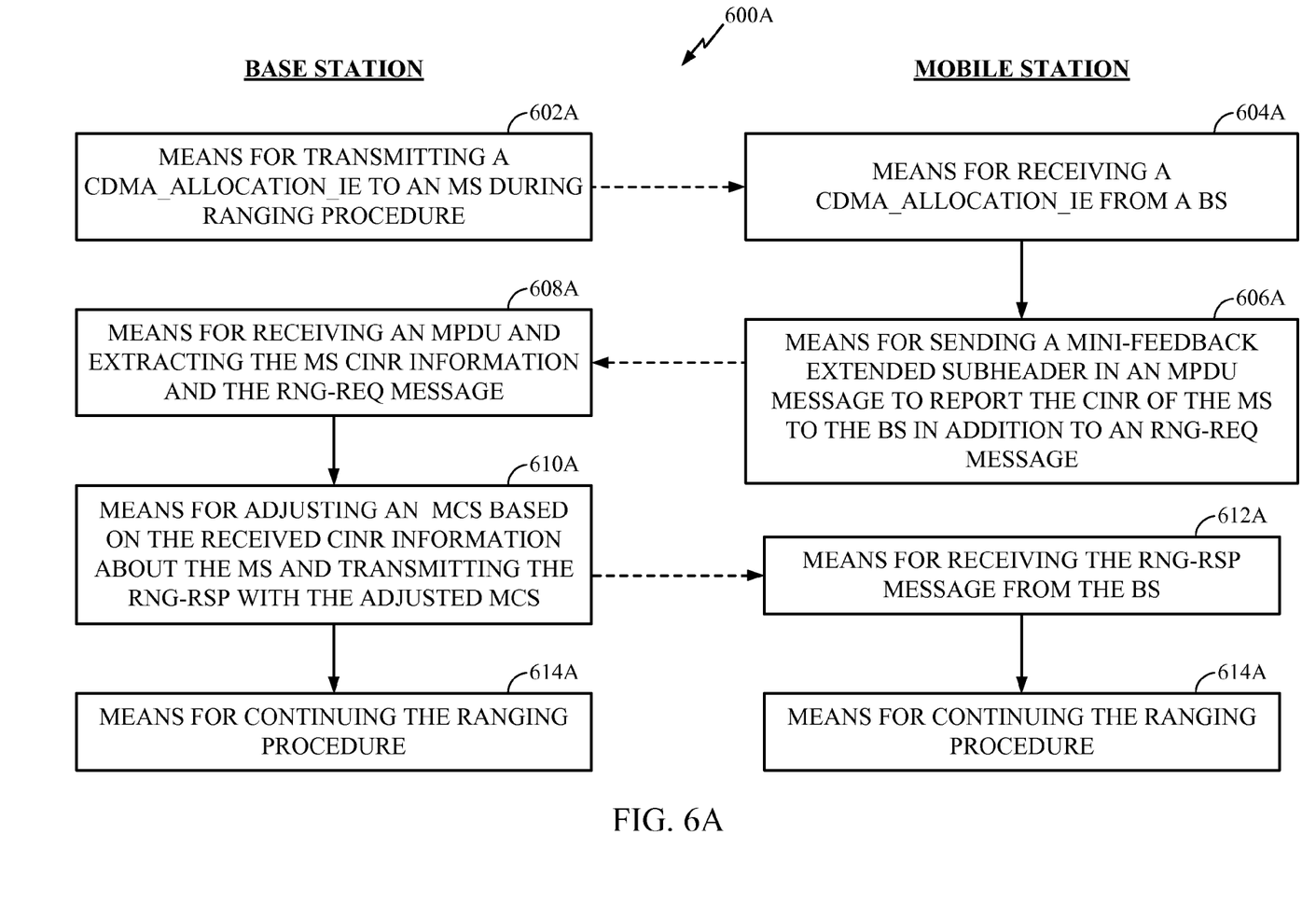
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 502-528 illustrated in FIG. 5 correspond to means-plus-function blocks 502A-528A illustrated in FIG. 5A. Also, blocks 602-614 illustrated in FIG. 6 correspond to means-plus-function blocks 602A-614A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a mobile station (MS), comprising:
   receiving, from a base station (BS), a first message during a ranging procedure comprising information about initial allocated bandwidth for the MS;
   requesting allocation of additional bandwidth comprising sending a fragmented ranging request message comprising a portion of the ranging request message and a request for the additional bandwidth;
   receiving a message from the BS comprising information about additional bandwidth; and
   transmitting at least a portion of the ranging request message using the additional bandwidth.

2. The method of claim 1, wherein the first message comprises a CDMA_Allocation_IE.

3. The method of claim 1, wherein:
   transmitting at least a portion of the ranging request message using the additional bandwidth comprises transmitting a remaining portion of the ranging request message that was not sent in the fragmented ranging request message.

4. The method of claim 1, wherein:
requesting allocation of additional bandwidth comprises sending a bandwidth request for a total number of bytes needed to transmit the ranging request message; and
transmitting at least a portion of the ranging request message using the additional bandwidth comprises transmitting the entire ranging request message in a single, unfragmented message.

5. The method of claim 1, wherein transmitting at least a portion of the ranging request message using the additional bandwidth comprises transmitting a CINR value in a Mini-Feedback Extended Subheader.

6. A method for wireless communications by a base station (BS), comprising:
transmitting, during a ranging procedure, a message comprising information regarding initial bandwidth allocated to a mobile station (MS);
receiving, from the MS in the initial allocated bandwidth, a message requesting allocation of additional bandwidth comprising a fragmented portion of a ranging request message;
transmitting a message to the MS with information regarding additional allocated bandwidth; and
receiving at least a portion of the ranging request message in the additional allocated bandwidth.

7. The method of claim 6, wherein the message comprising information regarding initial bandwidth allocated to the MS comprises a CDMA_Allocation_IE.

8. The method of claim 6, wherein:
receiving at least a portion of the ranging request message in the additional allocated bandwidth comprises receiving a remaining portion of the ranging request message in the additional allocated bandwidth.

9. The method of claim 6, wherein:
the message requesting allocation of additional bandwidth comprises a message requesting bandwidth for an entire portion of the ranging request; and
receiving at least a portion of the ranging request message in the additional allocated bandwidth comprises receiving the entire portion of the ranging request message in a single unfragmented message.

10. The method of claim 6, wherein:
receiving at least a portion of the ranging request message using the additional bandwidth comprises receiving a CINR value in a Mini-Feedback Extended Subheader; and
the method further comprises transmitting a ranging response message to the MS using a modulation and coding scheme adjusted based on the received CINR value.

11. An apparatus for wireless communications, comprising:
a processor;
memory in electronic communication with the processor; and
instructions stored in the memory, the instructions being executable by the processor to:
receive, from a base station (BS), a first message during a ranging procedure comprising information about initial allocated bandwidth for the apparatus;
request allocation of additional bandwidth configured to send a fragmented ranging request message comprising a portion of the ranging request message and a request for the additional bandwidth;
receive a message from the BS comprising information about additional bandwidth; and
transmit at least a portion of the ranging request message using the additional bandwidth.

12. The apparatus of claim 11, wherein the first message comprises a CDMA_Allocation_IE.

13. The apparatus of claim 11, further comprising instructions executable by the processor to transmit a remaining portion of the ranging request message that was not sent in the fragmented ranging request message.

14. The apparatus of claim 11, further comprising instructions executable by the processor to:
send a bandwidth request for a total number of bytes needed to transmit the ranging request message; and
transmit the entire ranging request message in a single, unfragmented message.

15. The apparatus of claim 11, further comprising instructions executable by the processor to transmit a CINR value in a Mini-Feedback Extended Subheader.

16. An apparatus for wireless communications, comprising:
a processor;
memory in electronic communication with the processor; and
instructions stored in the memory, the instructions being executable by the processor to:
transmit, during a ranging procedure, a message comprising information regarding initial bandwidth allocated to a mobile station (MS);
receive, from the MS in the initial allocated bandwidth, a message requesting allocation of additional bandwidth comprising a fragmented portion of a ranging request message;
transmit a message to the MS with information regarding additional allocated bandwidth; and
receive at least a portion of the ranging request message in the additional allocated bandwidth.

17. The apparatus of claim 16, wherein the message comprising information regarding initial bandwidth allocated to the MS comprises a CDMA_Allocation_IE.

18. The apparatus of claim 16, further comprising instructions executable by the processor to receive a remaining portion of the ranging request message in the additional allocated bandwidth.

19. The apparatus of claim 16, wherein:
the message requesting allocation of additional bandwidth comprises a message requesting bandwidth for an entire portion of the ranging request; and
the apparatus further comprises instructions executable by the processor to receive the entire portion of the ranging request message in a single unfragmented message.

20. The apparatus of claim 16, further comprising instruction executable by the processor to:
receive a CINR value in a Mini-Feedback Extended Subheader; and
transmit a ranging response message to the MS using a modulation and coding scheme adjusted based on the received CINR value.

21. An apparatus for wireless communications, comprising:
means for receiving, from a base station (BS), a first message during a ranging procedure comprising information about initial allocated bandwidth for the apparatus;
means for requesting allocation of additional bandwidth, the means for requesting allocation configured to send a fragmented ranging request message comprising a portion of the ranging request message and a request for the additional bandwidth;

means for receiving a message from the BS comprising information about additional bandwidth; and means for transmitting at least a portion of the ranging request message using the additional bandwidth.

22. The apparatus of claim 21, wherein the first message comprises a CDMA_Allocation_IE.

23. The apparatus of claim 21, wherein:
the means for transmitting at least a portion of the ranging request message using the additional bandwidth is configured to transmit a remaining portion of the ranging request message that was not sent in the fragmented ranging request message.

24. The apparatus of claim 21, wherein:
the means for requesting allocation of additional bandwidth is configured to send a bandwidth request for a total number of bytes needed to transmit the ranging request message; and
the means for transmitting at least a portion of the ranging request message using the additional bandwidth is configured to transmit the entire ranging request message in a single, unfragmented message.

25. The apparatus of claim 21, wherein the means for transmitting at least a portion of the ranging request message using the additional bandwidth is configured to transmit a CINR value in a Mini-Feedback Extended Subheader.

26. An apparatus for wireless communications, comprising:
means for transmitting, during a ranging procedure, a message comprising information regarding initial bandwidth allocated to a mobile station (MS);
means for receiving, from the MS in the initial allocated bandwidth, a message requesting allocation of additional bandwidth comprising a fragmented portion of a ranging request message;
means for transmitting a message to the MS with information regarding additional allocated bandwidth; and
means for receiving at least a portion of the ranging request message in the additional allocated bandwidth.

27. The apparatus of claim 26, wherein the message comprising information regarding initial bandwidth allocated to the MS comprises a CDMA_Allocation_IE.

28. The apparatus of claim 26, wherein:
the means for receiving at least a portion of the ranging request message in the additional allocated bandwidth is configured to receive a remaining portion of the ranging request message in the additional allocated bandwidth.

29. The apparatus of claim 26, wherein:
the message requesting allocation of additional bandwidth comprises a message requesting bandwidth for an entire portion of the ranging request; and
the means for receiving at least a portion of the ranging request message in the additional allocated bandwidth is configured to receive the entire portion of the ranging request message in a single unfragmented message.

30. The apparatus of claim 26, wherein:
the means for receiving at least a portion of the ranging request message using the additional bandwidth is configured to receive a CINR value in a Mini-Feedback Extended Subheader; and
the apparatus further comprises means for transmitting a ranging response message to the MS using a modulation and coding scheme adjusted based on the received CINR value.

31. A computer program product for wireless communications by a mobile station (MS), the computer program product comprising a non-transitory computer-readable medium having instructions stored thereon, the instructions being executable by one or more processors and the instructions comprising:
instructions for receiving, from a base station (BS), a first message during a ranging procedure comprising information about initial allocated bandwidth for the MS;
instructions for requesting allocation of additional bandwidth comprising instructions for sending a fragmented ranging request message comprising a portion of the ranging request message and a request for the additional bandwidth;
instructions for receiving a message from the BS comprising information about additional bandwidth; and
instructions for transmitting at least a portion of the ranging request message using the additional bandwidth.

32. The computer program product of claim 31, wherein the first message comprises a CDMA_Allocation_IE.

33. The computer program product of claim 31, wherein:
the instructions for transmitting at least a portion of the ranging request message using the additional bandwidth comprise instructions for transmitting a remaining portion of the ranging request message that was not sent in the fragmented ranging request message.

34. The computer program product of claim 31, wherein:
the instructions for requesting allocation of additional bandwidth comprise instructions for sending a bandwidth request for a total number of bytes needed to transmit the ranging request message; and
the instructions for transmitting at least a portion of the ranging request message using the additional bandwidth comprise instructions for transmitting the entire ranging request message in a single, unfragmented message.

35. The computer program product of claim 31, wherein the instructions for transmitting at least a portion of the ranging request message using the additional bandwidth comprise instructions for transmitting a CINR value in a Mini-Feedback Extended Subheader.

36. A computer program product for wireless communications, the computer program product comprising a non-transitory computer-readable medium having instructions stored thereon, the instructions being executable by one or more processors and the instructions comprising, comprising:
instructions for transmitting, during a ranging procedure, a message comprising information regarding initial bandwidth allocated to a mobile station (MS);
instructions for receiving, from the MS in the initial allocated bandwidth, a message requesting allocation of additional bandwidth comprising a fragmented portion of a ranging request message;
instructions for transmitting a message to the MS with information regarding additional allocated bandwidth; and
instructions for receiving at least a portion of the ranging request message in the additional allocated bandwidth.

37. The computer program product of claim 36, wherein the message comprising information regarding initial bandwidth allocated to the MS comprises a CDMA_Allocation_IE.

38. The computer program product of claim 36, wherein:
the instructions for receiving at least a portion of the ranging request message in the additional allocated bandwidth comprise instructions for receiving a remaining portion of the ranging request message in the additional allocated bandwidth.

39. The computer program product of claim 36, wherein:

the message requesting allocation of additional bandwidth comprises a message requesting bandwidth for an entire portion of the ranging request; and the instructions for receiving at least a portion of the ranging request message in the additional allocated bandwidth comprise instructions for receiving the entire portion of the ranging request message in a single unfragmented message.

40. The computer program product of claim 36, wherein:

the instructions for receiving at least a portion of the ranging request message using the additional bandwidth comprise instructions for receiving a CINR value in a Mini-Feedback Extended Subheader; and the instructions further comprise instructions for transmitting a ranging response message to the MS using a modulation and coding scheme adjusted based on the received CINR value.

* * * * *